Dec. 18, 1956  A. BALLASH ET AL  2,774,282
REPEATING ROCKET LAUNCHER
Filed Feb. 8, 1951  8 Sheets-Sheet 1
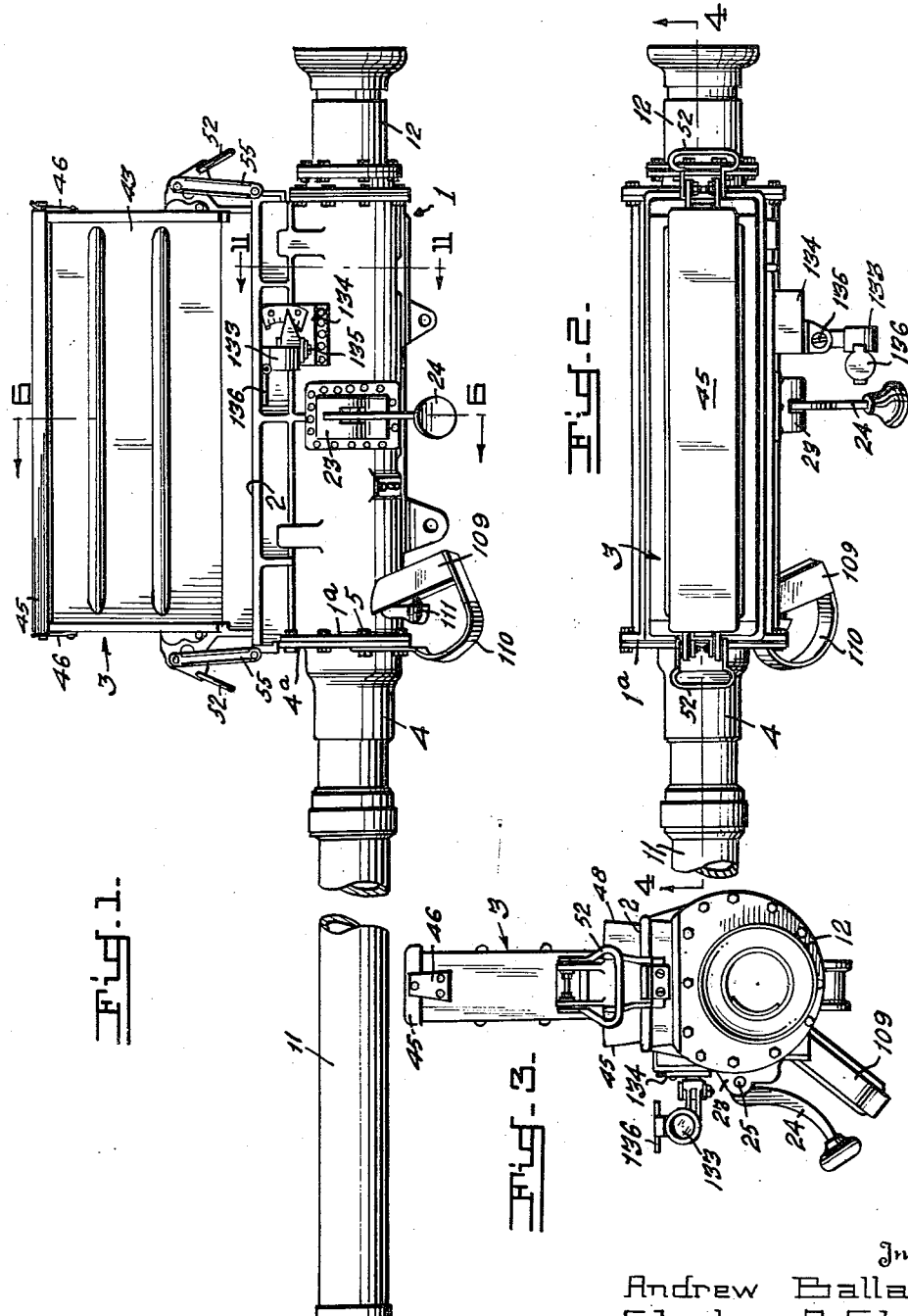
Inventors,
Andrew Ballash
Stephen A. Stam
Paul E. Anderson
By J. H. Church, O. Codier + A. W. Dew
Attorneys Dec. 18, 1956   A. BALLASH ET AL   2,774,282
REPEATING ROCKET LAUNCHER
Filed Feb. 8, 1951   8 Sheets-Sheet 2
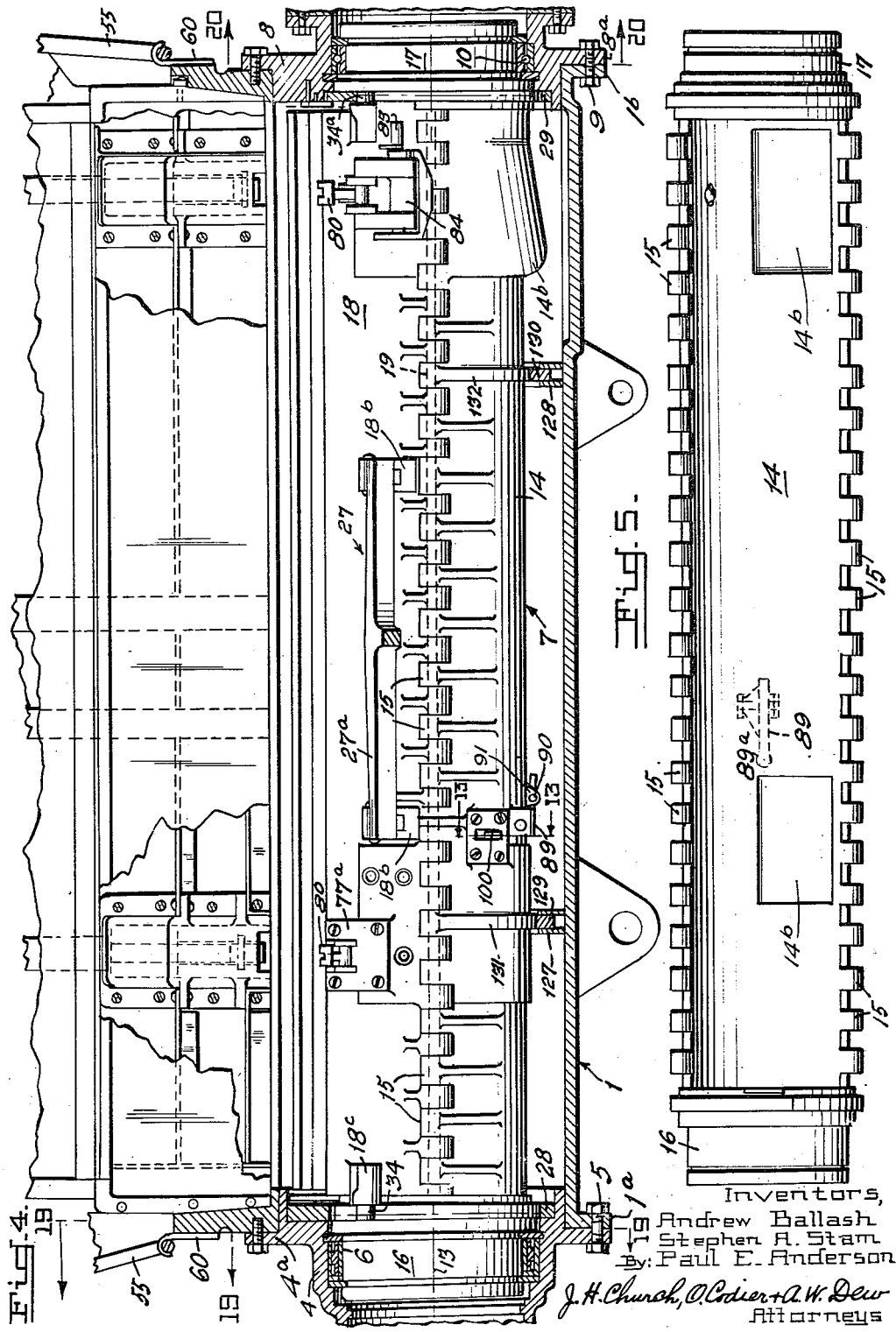
Inventors,
Andrew Ballash
Stephen A. Stam
By: Paul E. Anderson
J. H. Church, O. Cadier + A. W. Dew
Attorneys Dec. 18, 1956 A. BALLASH ET AL 2,774,282
REPEATING ROCKET LAUNCHER
Filed Feb. 8, 1951 8 Sheets-Sheet 3

Inventors,
Andrew Ballash
Stephen A. Stam
Paul E. Anderson
By J. H. Church, O. Codier & A. W. Dew
Attorneys Dec. 18, 1956    A. BALLASH ET AL    2,774,282
REPEATING ROCKET LAUNCHER
Filed Feb. 8, 1951    8 Sheets-Sheet 4
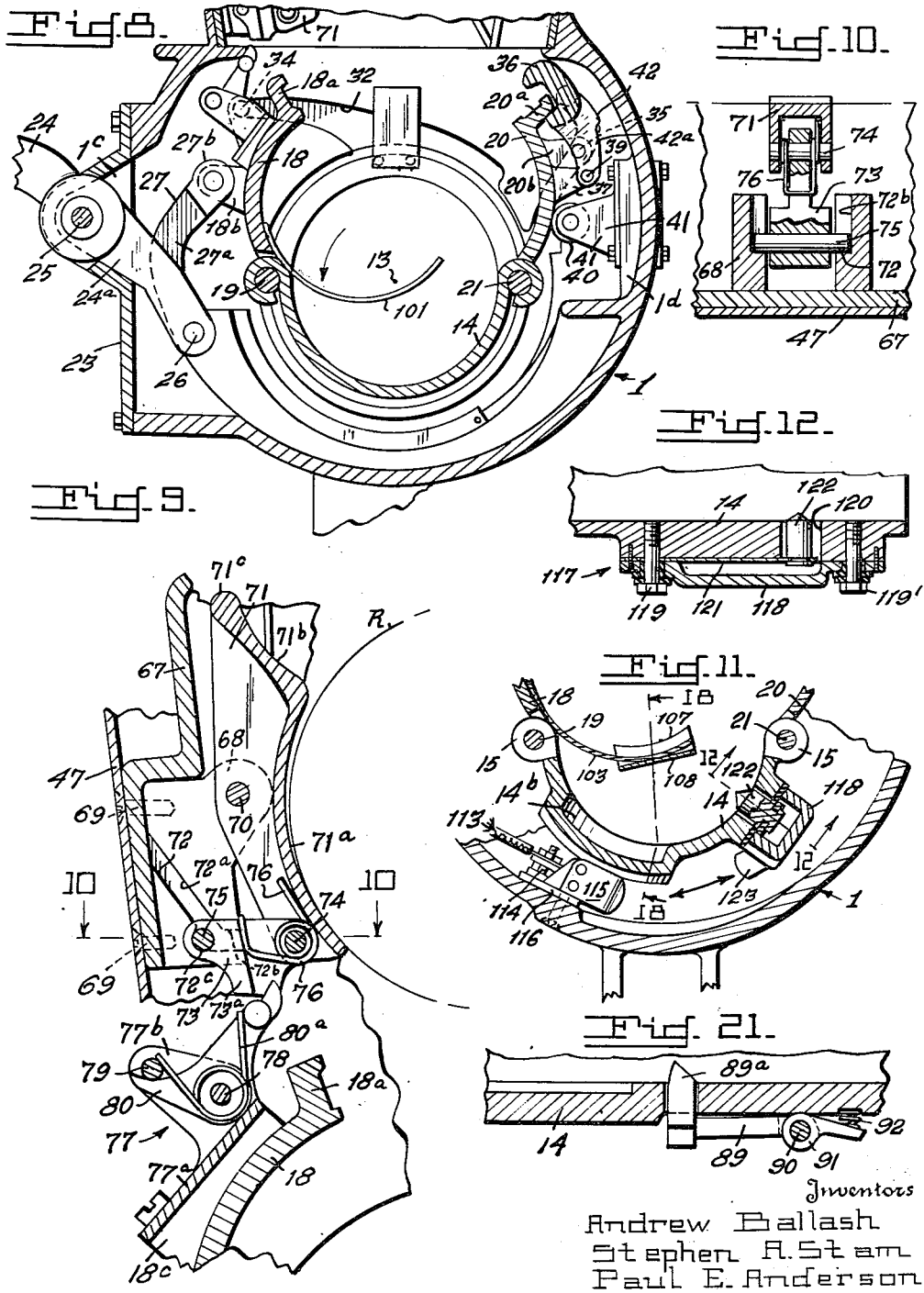

Dec. 18, 1956  A. BALLASH ET AL  2,774,282
REPEATING ROCKET LAUNCHER
Filed Feb. 8, 1951  8 Sheets-Sheet 5
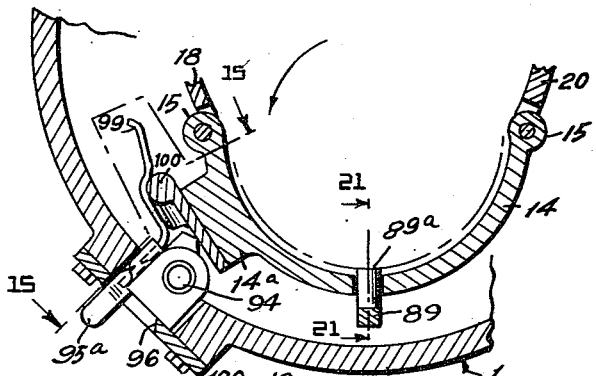
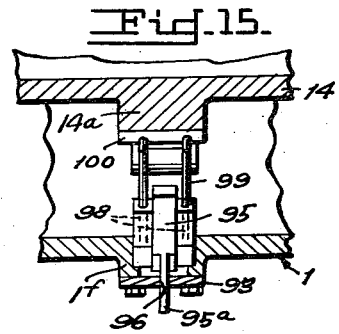
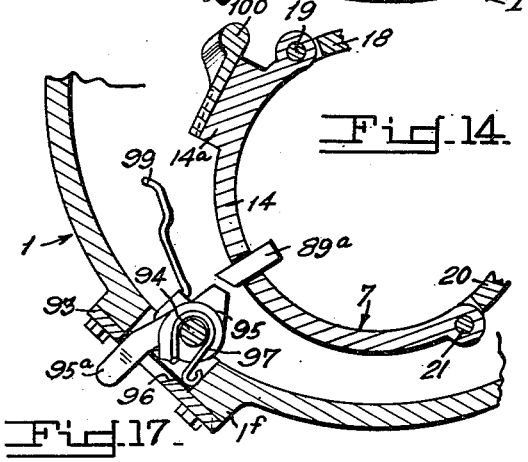
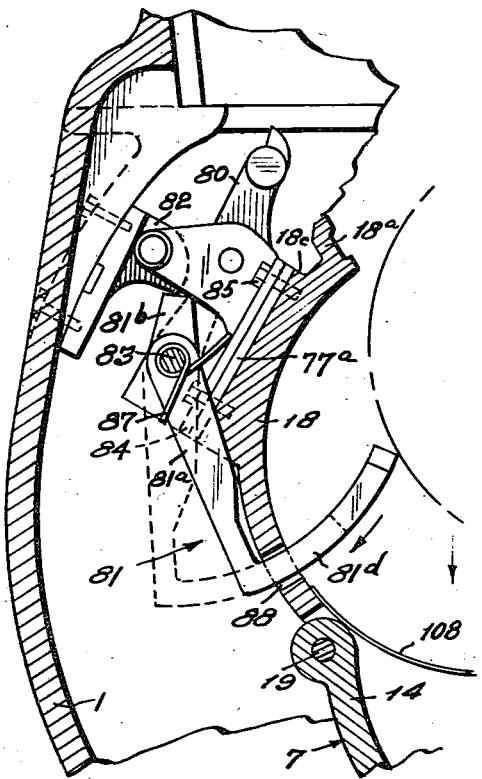
Inventors
Andrew Ballash
Stephen A. Stam
Paul E. Anderson
By J. H. Church, O. Codier + A. W. Dew
Attorneys Dec. 18, 1956 A. BALLASH ET AL 2,774,282
REPEATING ROCKET LAUNCHER
Filed Feb. 8, 1951 8 Sheets-Sheet 6
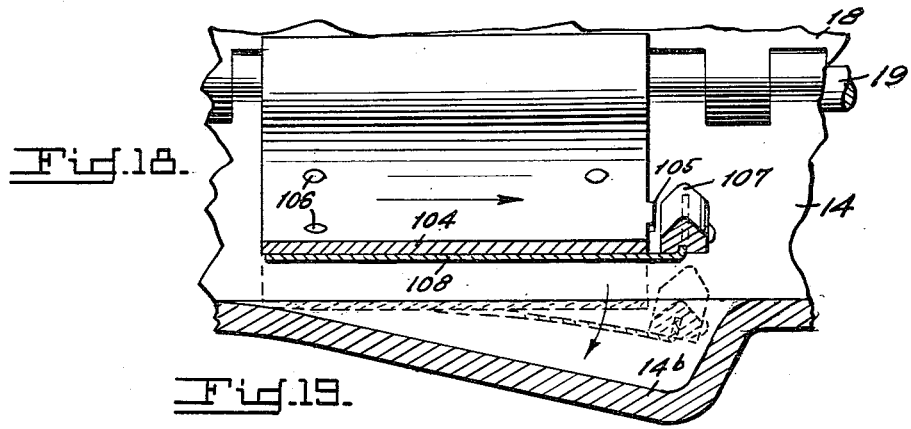
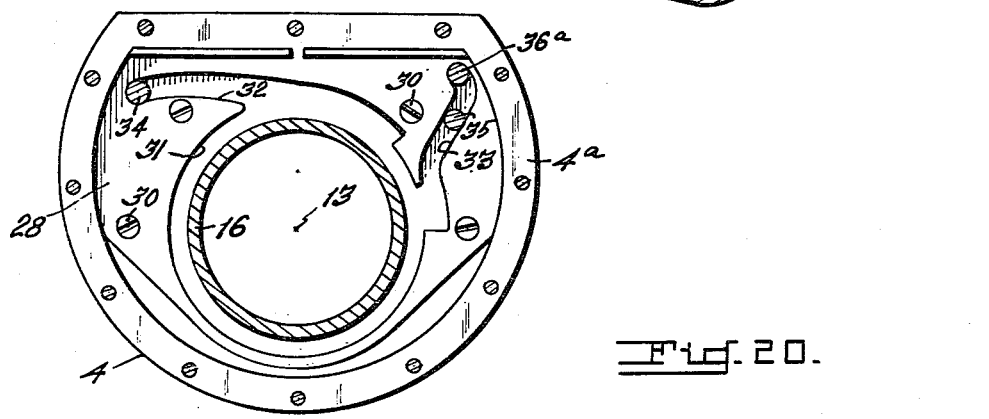
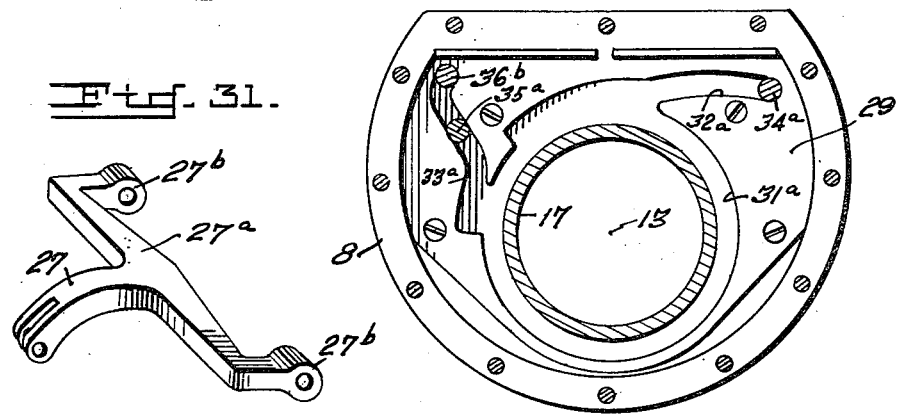
Inventors
Andrew Ballash
Stephen A. Stam
Paul E. Anderson
By J. H. Church, O. Codier + A. W. Dew
Attorneys Dec. 18, 1956 A. BALLASH ET AL 2,774,282
REPEATING ROCKET LAUNCHER
Filed Feb. 8, 1951. 8 Sheets-Sheet 7
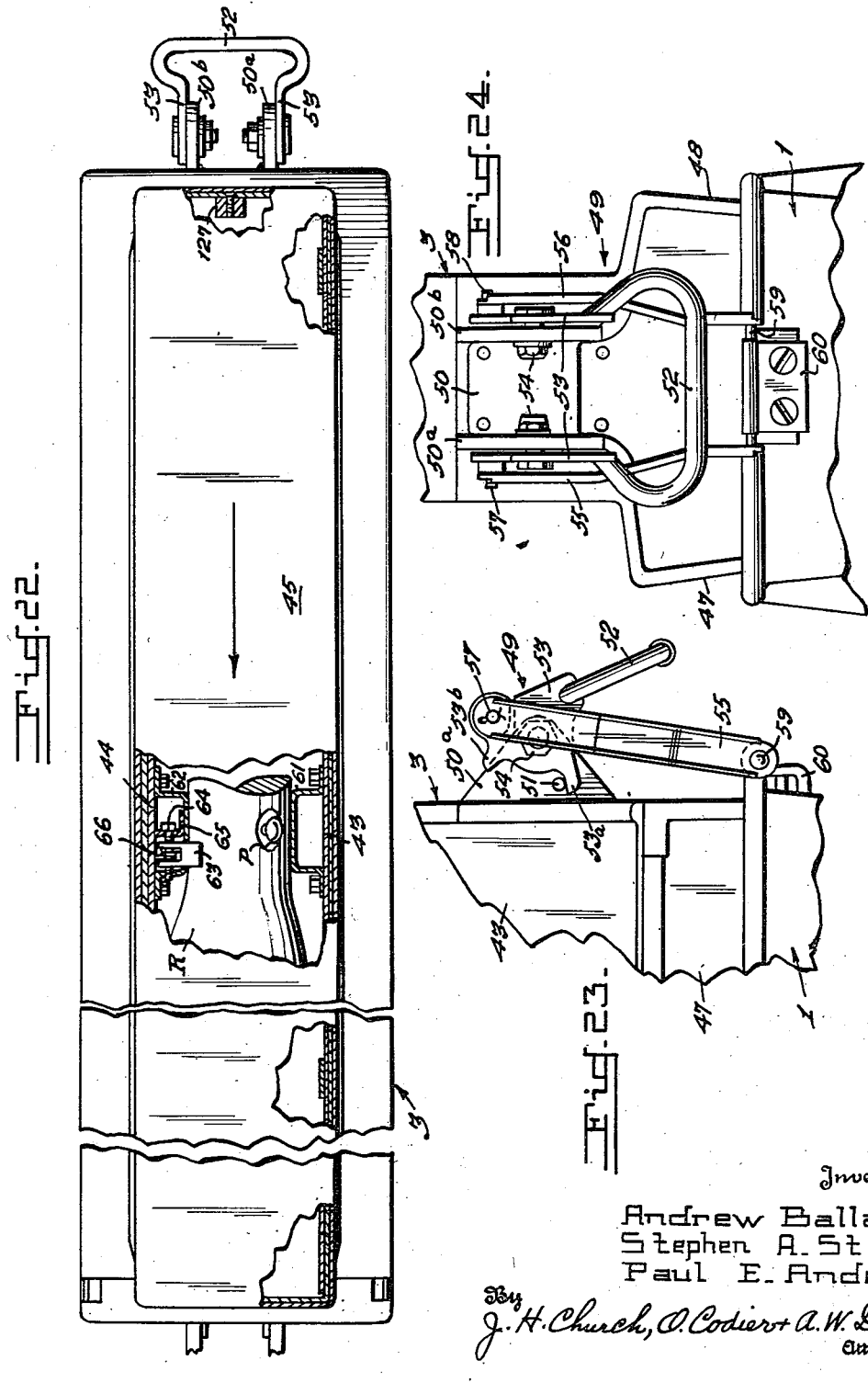
Inventors
Andrew Ballash
Stephen A. Stam
Paul E. Anderson
By J. H. Church, O. Codier + A. W. Dew
Attorneys Dec. 18, 1956     A. BALLASH ET AL     2,774,282
REPEATING ROCKET LAUNCHER
Filed Feb. 8, 1951     8 Sheets-Sheet 8
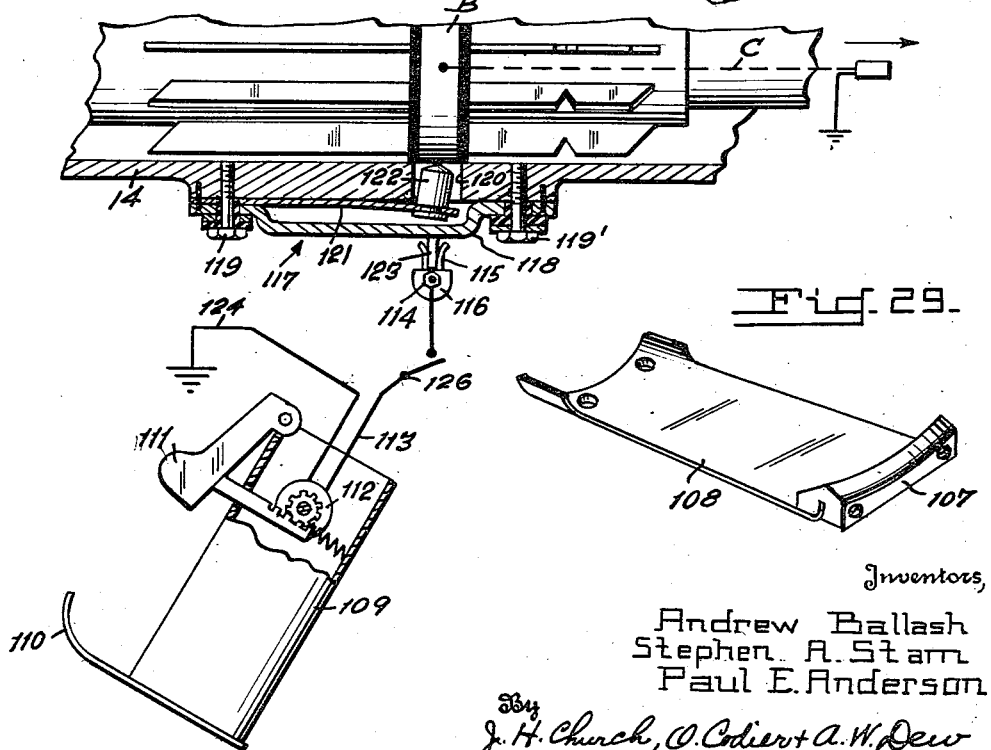

United States Patent Office 2,774,282
Patented Dec. 18, 1956

2,774,282

REPEATING ROCKET LAUNCHER

Andrew Ballash, Los Angeles, Stephen A. Stam, Glendale, and Paul E. Anderson, Torrance, Calif., assignors to the United States of America as represented by the Secretary of the Army Application February 8, 1951, Serial No. 210,026

21 Claims. (Cl. 89—1.7)

This invention relates to repeater or semi-automatic rocket launchers wherein a plurality of rockets may be rapidly fed to a single launching tube and launched therefrom in rapid succession.

Among the principal objects of the invention are (1) to provide a repeater launcher as aforesaid wherein the launching tube is formed in longitudinally-divided sections and may be opened for feeding of a rocket thereinto in a lateral or transverse direction, (2) to provide a launcher wherein the operation of opening the launching tube automatically feeds a rocket into the tube from a magazine containing a plurality of rockets, (3) to provide a launcher wherein a magazine may be placed in position while loaded or an empty magazine may be loaded while in position upon the launcher, (4) to provide a launcher of the semi-automatic type wherein the launching tube is held in closed or firing position as long as a rocket is therein, (5) to provide a launcher of the type described in which the tube is held in open position unless and until a rocket is fed thereinto, (6) to provide a firing circuit in a launcher which cannot be operated unless and until a rocket has been deposited thereinto and the launcher tube has been moved to closed or firing position, (7) to provide a launching tube for rockets which is opened and closed by and in response to rotation of the tube elements as a unit about the common longitudinal axis of the component tube parts when in closed position, and (8) to provide a launcher which is relatively simple to load and operate, rugged and reliable in construction and operation, and which will greatly increase the fire and offensive power of each launcher and its operating personnel.

Other objects and advantages will be apparent from a study of the following specification in connection with the accompanying drawings.

In the drawings:

Fig. 1 is a side elevation of the launcher removed from its supporting tripod.

Fig. 2 is a top plan view corresponding to Fig. 1.

Fig. 3 is a rear elevation corresponding to Fig. 1.

Fig. 4 is a central longitudinal vertical section on line 4—4, Fig. 2, the launching tube itself being shown in elevation with the launching chamber open.

Fig. 5 is a detail plan view of the lower half of the firing chamber.

Fig. 8 is a transverse sectional view to an enlarged scale, corresponding to Fig. 6 but showing the firing chamber sections open to receive a rocket, as in Fig. 4.

Fig. 9 is a detail sectional view to an enlarged scale showing the forward release mechanism by which the lowermost rocket of a superposed series in the magazine, is released for descent into the firing chamber.

Fig. 10 is a detail sectional view in a plane identified by the line 10—10 of Fig. 9.

Fig. 11 is a sectional view taken in a plane identified by the line 11—11 of Fig. 1 and showing the rear spring cradle, detent, and safety firing switch.

Fig. 12 is a detail sectional view of the firing contact assembly, and taken in a plane identified by the line 12—12 of Fig. 11.

Fig. 13 is a detail sectional view on line 13—13 of Fig. 4 showing the means for releasably holding the tube in open or loading position and also for holding the tube closed as long as a rocket is therein.

Fig. 14 is a view corresponding to Fig. 13 but showing the firing chamber closed and rotated into firing position.

Fig. 15 is a detail view in a plane identified by the line 15—15, Fig. 13.

Fig. 16 is a detail view to an enlarged scale, of the latch mechanism by which the launching tube is held open unless and until a rocket is fed thereinto.

Fig. 17 is an elevational view of the mechanism of Fig. 16 at right angles to the plane of that figure, as viewed from the left.

Fig. 18 is a detail sectional view of the rear spring cradle and detent for cushioning the fall of a rocket into the firing chamber and yieldingly and releasably maintaining it in longitudinal position in the tube.

Fig. 19 is an elevational view of the forward cam plate for opening and closing the firing chamber, taken upon line 19—19, Fig. 4.

Fig. 20 is an elevational view of the rear cam plate cooperating with the forward cam plate, and taken on line 20—20, Fig. 4.

Fig. 21 is a sectional view in a plane identified by the line 21—21, Fig. 13.

Fig. 22 is a top plan view of the magazine for use in connection with the launcher, parts being shown in section.

Fig. 23 is a side elevation of one of the two handles and connecting means between the launcher and magazine.

Fig. 24 is an end elevation corresponding to Fig. 23.

Fig. 25 is an end elevation of the launching tube door clamp showing more particularly one of the three duplicate and regularly-spaced brackets and its operating cam edge.

Fig. 26 is a side elevation of the launching tube door clamp showing more particularly the operating end pins.

Fig. 27 is a perspective view of the sear for operating the escapement mechanism controlling the release of the lowermost rocket in the magazine.

Fig. 28 is a perspective view of the bracket mounting the launching tube safety stop.

Fig. 29 is a perspective view of the spring detent carried by the rear rocket cradle.

Fig. 30 is a partly diagrammatic view showing the firing circuit, generator and safety switches, and Fig. 31 is a perspective view of the operating lever for the launcher tube.

Figures 6, 7:
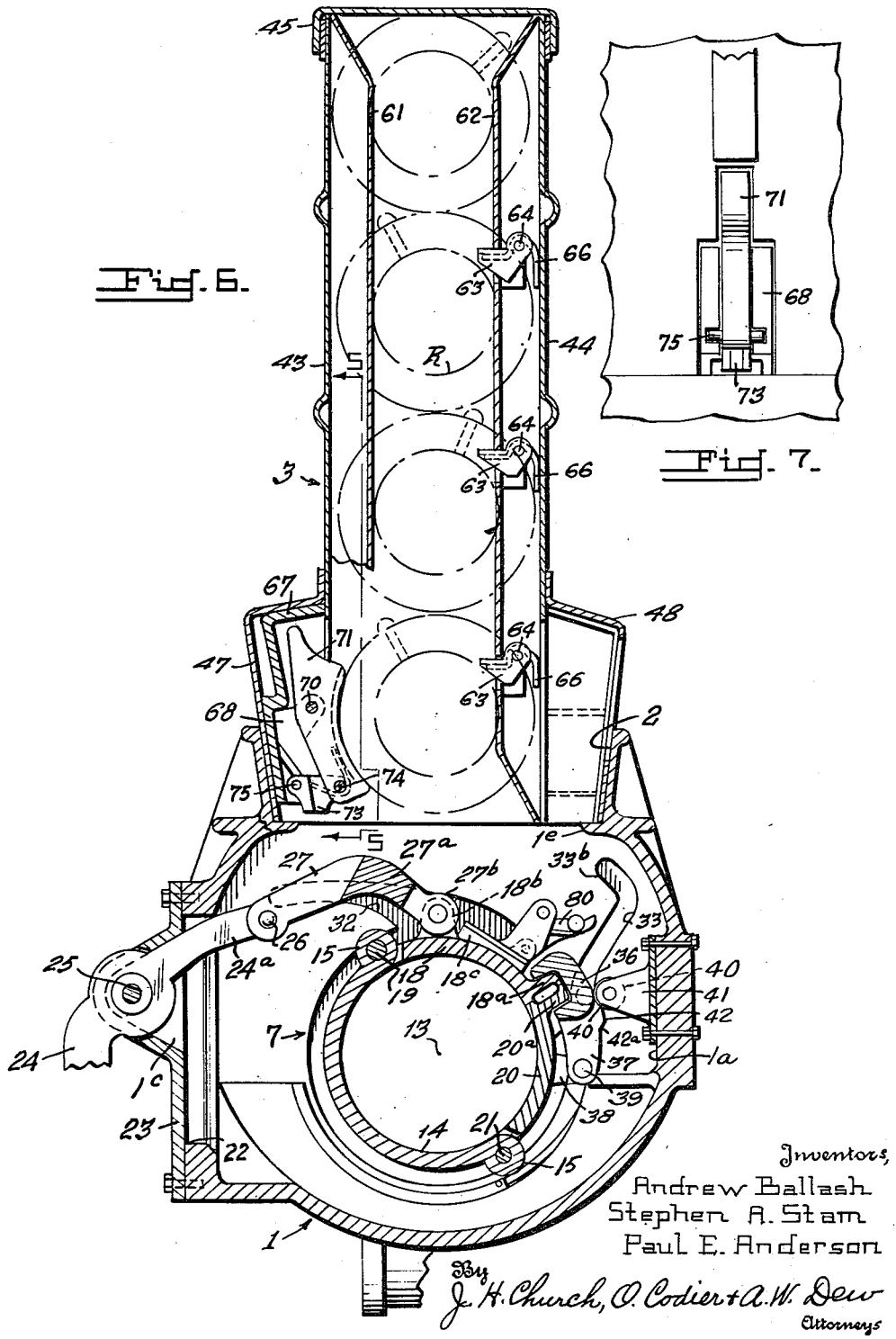
Fig. 6 is a transverse vertical section taken in a plane identified by the line 6—6, Fig. 1, the firing chamber being locked in closed or firing position.
Fig. 7 is an elevation of the forward escapement mechanism for releasing a rocket in the magazine for movement into the launching tube.

Referring in detail to the drawings, the numeral 1 identifies generally a main body or frame which may be a casting in the general form of a horizontal cylinder having a rectangular opening 2 in its top for the reception of a removable magazine 3, subsequently described in detail. As best shown in Figs. 1 through 4, the forward end of body 1 is flanged, as at 1a, and has an adapter 4 similarly flanged at 4a. Bolts 5 secure the body and adapter together. That portion of the adapter adjacent frame 1 is formed to accommodate an antifriction bearing 6 within which the forward end of the firing chamber, generally identified at 7, is rotatably mounted. The rear end of frame 1 is similarly flanged at 1b, to which the flange 8a of a rear adapter or bearing support 8 is bolted as at 9. This adapter 8 receives and supports a second antifriction bearing 10 which may be a duplicate of bearing 6 and which rotatably supports the rearward end of firing chamber 7. The two bearings 6 and 10 are, of course, in alignment and together determine the principal axis 13 of rotation of the firing chamber. A main barrel 11 is secured by a conventional interrupted thread, not shown, to the forward end of adapter 4. A rear barrel portion 12 is bolted to adapter 8 by means of mating flanges, as clearly shown upon Figs. 1 and 2. The forward or main barrel 11, the rear barrel portion 12, and the firing chamber have axis 13 in common.

The firing chamber

The firing chamber 7 consists of a main generally semi-cylindrical portion 14, Fig. 5, having aligned lugs 15 formed along both longitudinal edges and which form portions of continuous or piano type hinges. Aligned bearing sleeves 17 and 16 are integrally related with the forward and rear ends, respectively, of portion 14, which portions are mounted in bearings 6 and 10, whereby the chamber is mounted for pivotal movement about axis 13 which is also the axis of semi-cylindrical portion 14. A left door or quarter-cylindrical portion 18 has hinge lugs interfitting with those along the edges of semi-cylindrical portion 14 for pivotal connection by a hinge pin 19. As will be clear from inspection of Figs. 4 and 5, the hinge joint is continuous and extends throughout the length of the parts connected. In a similar manner, a right door or quarter-cylindrical portion 20 is hingedly connected by pin 21 with the other longitudinal edge of semi-cylindrical portion 14. These doors are therefore so shaped and related with part 14 that when closed, the three elements form a complete cylindrical firing chamber, as clearly shown in Fig. 6. As there shown, the doors at their separable edges are provided with radial flanges 18a and 20a which are in closely adjacent relation when the doors are closed to firing position and which may be utilized to lock or clamp the doors in such relation.

The mechanism for rotating the firing chamber and simultaneously actuating the doors thereof for loading Manually operated means are provided to actuate the doors 18 and 20 between open and closed position, and to lock and unlock them when closed, by and in response to their bodily rotation as a unit about axis 13, of the elements comprising the firing chamber. From Figs. 1, 2 and 6, it is seen that body 1 is formed at its left central portion to provide an opening 22 surmounted by spaced lugs 1c, one of which is shown in Figs. 6 and 8. The opening is normally closed by a housing 23 bolted to the body and shaped to fit snugly about the lugs and to provide an opening through which the lever 24 may extend. The lever is pivoted between the lugs by means of a pivot pin 25 passing through aligned bores in the lugs and lever.

The mechanism now to be described is connected with and controlled by the lever 24 so that when the latter is in its lowermost position as shown at Figs. 1–3 and 6, the firing chamber is closed and the doors thereof locked, as in Fig. 6, while when the lever is in uppermost position, the firing chamber is opened to receive a rocket therein as it is released by indexing mechanism subsequently described and drops from the magazine.

The lever 24 has its arm 24a within the housing pivotally connected at 26 with a link 27 having an elongated body portion 27a shown in cross section in Figs. 6 and 8. See also Fig. 31. The ends of this elongated portion are provided with aligned apertured lugs 27b, each of which is pivotally connected with a corresponding lug 18b integral with door 18. It will be understood that the lugs 18b are widely spaced longitudinally of the door 18. By this construction, when lever 24 is pivoted between its two extreme positions described, the left door 18 is first closed, and then the complete firing chamber is rotated in its bearings 16 and 17, through an angle of about 60°. In one extreme position, shown in Fig. 8, the main portion 14 faces upwardly and doors 18 and 20 are open. In the other extreme position of Fig. 6, the portion 14 is rotated clockwise as viewed from the rear, through the aforesaid angle, and the doors are closed and locked.

Opening and closing of the doors 18 and 20, in response to rotation of the firing chamber about axis 13, is effected and controlled by a forward cam plate 28, Fig. 19, and a rear cam plate 29, Fig. 20. From Figs. 4 and 19 it will be noted that cam plate 28 is positioned within adapter 4 rearwardly of bearing 6, and is secured to the adapter by screws 30. The forward cam plate has a central generally circular aperture 31 from which two slots or grooves 32 and 33 extend in a generally tangential direction. A guide pin or rider 34 fixed to a lug 18c, Fig. 4, integral with door 18 at the forward end thereof, has a smooth sliding fit in slot 32. Likewise, a pin 35 fixed to a lug 20b (Fig. 8) a smooth sliding fit within slot 33. The slots are so shaped and proportioned that when the firing chamber is rotated clockwise as seen in Fig. 19, through the aforesaid angle of about 60°, both doors 18 and 20 are pivoted to the closed position of Fig. 6. Of course, rear cam plate 29 assists in effecting the pivotal movement of the doors. As this cam is a duplicate of the forward cam it will be sufficient, referring to Fig. 20, to identify rear bearing sleeve 17, aperture 31a, slots 32a and 33a, and pins or riders 34a and 35a fixed to the rear ends of doors 18 and 20, respectively.

The radial flanges or lips 18a and 20a of the chamber doors have been previously mentioned. These flanges extend throughout the length of the doors and are formed with faces which contact when the doors are in closed or firing position. An elongated clamp member 36, Figs. 6 and 8, is generally C-shaped in cross section and, as clearly shown in Fig. 6, adapted to fit over and about the contacting flanges 18a and 20a to secure the firing chamber in closed position. The clamp member is hinged to door 20, for pivotal movement about an axis parallel to the longitudinal axis thereof, by means of three integral apertured lugs 37, one of which appears upon Fig. 6. These lugs are regularly spaced along the length of the clamp member and each is pivoted, as at 39, Fig. 6, between a respective pair of three pairs of lugs 38 rigidly secured to door 20. The ends of clamp member 36 are provided with integral aligned pins 36a and 36b, front and rear, respectively, each adapted to ride in grooves 33 and 33a, respectively. The arrangement and disposition of the parts are such that, simultaneously with pivotal movement of the doors 18 and 20 into closed position, pins 36a and 36b coact with grooves 33 and 33a to pivot clamp 36 over the contacting flanges 18a and 20a and secure the firing chamber closed.

Three locking or hold-down rollers are secured to the inside of frame 1. One of these rollers 40 is shown at Fig. 8. Each roller is journaled in a base 41 bolted to a pad 1d integral with the right inside surface of frame 1. All three rollers have a common axis which is parallel to the axis of the firing chamber. Each roller is positioned in the same transverse plane with respective lugs or arms 37. From Figs. 6 and 25 it will be noted that these arms have cam edges 42 including an intermediate riser 42a. As handle 24 is pivoted downwardly from its position indicated upon Fig. 8, door 18 is first pivoted to closed position about the axis of hinge pin 19. As soon as door 18 has moved to closed position, the entire launcher tube assembly begins to rotate in its bearings 6 and 10 and door 20 is closed by the cooperative action of pins 35 and 35a and their respective grooves 33 and 33a. From Figs. 6, 8, 19 and 20, it will be noted that the grooves 33 and 33a have an initial portion, such as 33b, Fig. 6, which extends substantially as an arc about axis 13 and has a very small radial component. These portions are traversed by pins 36a and 36b of the clamp member at the beginning of closure movement of door 20. At that time, pins 35 and 35a of door 20 are riding in a portion of the grooves having about equal circumferential and radial components. Because of this difference in radial component movements of pins 35 and 36a in groove 33, and 35a and 36b in groove 33a, the clamp member is initially pivoted clockwise as viewed in Fig. 8, relatively to door 20, whereby it is held free of the flanges 18a and 20a as the two come into contact. After the two flanges meet, continued rotation of the launcher tube assembly about axis 13, brings cam edges 42 into engagement with rollers 40. These rollers as they engage riser 42a, force the clamp member firmly down over the door flanges to form a complete cylindrical firing chamber as shown upon Fig. 6. From this figure it will be noted that when the firing chamber is closed, pivot 26 is a little above a line connecting pivot 25 and the pivot between lugs 18b and 27b thus, in effect, locking the chamber in the position shown as long as the lever 24 remains in downwardmost position. On upward movement of lever 24, the action just described is reversed and the doors 18 and 20 are first unclamped and then restored to the open position of Fig. 8, with semi-cylindrical portion 14 facing upwardly.

*The magazine*

The magazine 3, previously generally identified comprises a generally rectangular built-up sheet metal structure including parallel vertical sides 43 and 44, Fig. 6, and end portions rigidly connected therewith, to form an enclosure open at the top and over which a flanged cover 45 is adapted to fit. Spring clips 46, Fig. 1, releasably hold the cover in place. Sheet metal portions 47 and 48 are welded along the lower edges of side walls 43 and 44 to form a downwardly tapering broadened base portion adapted to have a smooth fit within the correspondingly tapered top opening 2 in frame 1. When fully seated in the frame, the lower edge of the magazine base rests upon a ledge 1e, Fig. 6, of frame 1.

Combined clamp and handle mechanism, as generally identified at 49, Figs. 22, 23 and 24, is provided to facilitate handling of the magazine and to releasably lock it in operative position in opening 2, as shown upon Fig. 6. Since the two mechanisms, one at each end of the magazine, are duplicates, a description of one will suffice. Referring particularly to Figs. 22 and 23, a base 50 is riveted to the lower portion of the magazine end. This base has two outstanding parallel ears 50a and 50b, each of which is provided with a stop pin such as 51, Fig. 23.

A handle comprises a central grip 52 having its ends welded to identical stop plates 53, one of which is clearly shown at Fig. 23. These plates are pivoted to the respective ears 50a and 50b by bolts 54 passing through aligned apertures in plates and ears. Each plate is provided with stop lugs 53a and 53b which coact with pins 51 in limiting pivotal movement of the handle to approximately 60°. A clamping bail consists of straps 55 and 56, each pivoted at one end, as at 57 and 58, respectively, to a respective plate 53. The other end of the straps are united by a rod 59 which, when the magazine is secured to the launcher, is adapted to engage beneath a hook 60 bolted to the adjacent ends of frame 1. When the parts are in the clamping position of Figs. 23 and 24, the axis of bolts 54 is slightly offset from the line connecting the axis of pivot 57 with rod 59 whereby the tension in straps 55 tend to rotate plates 53 clockwise as seen in Fig. 23 with lugs 53a in engagement with stop pins 51, whereby the parts are held connected. To release the magazine for removal from the launcher, it is merely necessary to lift up on grips 52 to thereby pivot plates 53 counterclockwise as seen in Fig. 23 and thereby relieve straps 55 from tension and release rod 59 from hook 60, in a manner obvious from inspection of the drawing, whereupon the magazine may be lifted out for refilling or replacement with a freshly-loaded magazine.

A pair of guide elements 61 and 62, Figs. 6 and 22, are bolted in vertical position to the inside surfaces of the magazine side walls 43 and 44 in opposite relation. The elements are spaced a distance to accommodate between them with ample clearance, the reduced midportion of a rocket R, Fig. 22. From Fig. 6 it will be noted that the guide elements 61 and 62 are outwardly tapered at top and bottom, whereby to facilitate the loading of rockets into the magazine at the top and their drop by gravity into the open firing chamber at the bottom.

The magazine shown is adapted to contain from one to four rockets. However, it will be understood that magazines may be readily built to accommodate a greater maximum number of rockets. Detent means are provided to engage each rocket and maintain it against upward displacement within the magazine. For this purpose, a plurality of vertically-spaced detents are mounted within the guide element 62. All of the detents are duplicates. Hence a description of the uppermost one will suffice. Referring to Figs. 6 and 22, a pawl or detent 63 is pivoted within guide 62 adjacent the forward wall thereof. The pawl is formed from sheet metal and is formed with aligned holes to receive a pivot pin 64 also passing through aligned holes in the forward wall of the guide and an L-shaped bracket 65 welded to the inner wall of the guide. A coil spring 66 surrounds pivot 64 and has one end engaging side wall 44 and its other end engaging the pawl to urge the latter into clockwise rotation as viewed in Fig. 6. As clearly shown upon Fig. 6, a portion of the pawl projects through a slot in guide 62 into the rocket chamber. The slot is so located that its upper edge acts as a stop for limiting the clockwise movement of the pawl to the full-line position shown in the figure, while permitting counterclockwise movement to a position wherein the pawl is entirely within the guide 62. The number of pawls or detents shown is one less than the number of rockets which can be loaded into the magazine; and they are so disposed that when the magazine is filled, with the rockets stacked one above another, such detent will contact, or substantially contact, a respective rocket. Thus, while the detents permit unobstructed downward movement of the rockets into the magazine when loaded from the top, they prevent upward movement of the rockets remaining in the magazine after one or more have been dropped into the firing chamber. Such a feature is desirable as where the launcher is subject to shocks and jars, or is tilted in transport.

*The rocket feeding mechanism*

After a rocket is fired, by mechanism subsequently described, handle 24 is raised to simultaneously rotate the firing chamber and open the doors thereof to the open or loading position of Fig. 8. As the firing chamber moves into the loading position, feeding mechanism generally shown in Figs. 6 and 8 to 10 is operated thereby to release the lowermost rocket in the magazine and permit it to drop by gravity into the chamber. This mechanism comprises duplicate front and rear release or escapement means, parts of which are carried by the magazine 3 and parts by the door 18. Those portions of the release mechanism carried by the magazine include a reinforcement or base 67, Figs. 6 and 9, interposed between the sheet metal base portion 47 and a pair of longitudinally-spaced supports 68. The elements are secured together by screws 69 passing through holes in 47 and 67 and threaded into 68. The two supports 68, only one of which appears in Fig. 9, are provided with aligned apertures to receive a pivot pin 70. An escapement lever 71 is journaled upon pin 70 between supports 68 and includes two angularly-related arcuate faces 71a and 71b, the former having substantially the same radius as the rocket.

The supports 68 have confronting cam grooves 72 formed therein, each groove comprising an upwardly and outwardly-extending straight portion 72a and a connecting horizontal portion 72b, with a notch 72c at their junction. A sear 73 is pivoted by a pin 74 to the lower end of lever 71, between the side walls thereof, and at its other end carries a pin 75 whose projecting ends have a smooth sliding fit in the respective cam grooves. See Figure 10. A spring 76 surrounds pin 74, at both sides of sear 73 and has a loop extending over and across the top of the sear and ends engaging lever 71, whereby the sear is urged counterclockwise about pivot 74, as viewed in Fig. 9 and pin 75 is yieldingly held in notch 72c. When the parts just described are in the positions shown upon Fig. 9, with the lowermost rocket R in the magazine fitting within the arcuate portion 71a of the lever, the rocket is held against downward movement. However, when a force is applied to the downwardly-projecting portion 73a of sear 73 tending to pivot it clockwise about pivot 74, pin 75 is forced out of notch 72c and rides up the inclined portions 72a of grooves 72 and pivots lever 71 clockwise about pin 70 to thereby release the lowermost rocket for movement into the launching tube and, at the same time, to move the nose 71c into the path of the next rocket above to hold it against any but a limited downward movement. Then, when the sear is released, spring 76 acts to restore the parts to the position shown in Fig. 9, thus permitting the rocket held by nose 71c to move downwardly into position ready for loading into the launching tube. It will be understood that there are two substantially duplicate escapement mechanisms as just described, one adjacent the forward end of the tube and the other adjacent the rearward end thereof and that the two mechanisms are operated synchronously whereby a rocket is first supported at both ends and then instantly released at both ends for movement into the launching tube.

The means for operating sear 73 in response to opening of the doors, when main tube portion 14 is in upwardly-facing position, is carried by left door 18 and comprises duplicate trippers, each operating in conjunction with a respective one of sears 73. One of these trippers is well shown upon Fig. 9 and includes a bracket 77 including a flat base 77a bolted or otherwise secured to a pad 18c integral with door 18. The bracket has parallel spaced upstanding ears one of which is shown at 77b and having aligned apertures within which are fixed a pair of parallel pins 78 and 79. A lever 80 is pivoted on pin 78, between ears 77b and has a first end adapted to engage pin 79 as a stop when urged into limiting clockwise movement, as seen in Fig. 9, by a spring 80a. This spring has two connected but axially-spaced coils extending about the hub of lever 80. The two ends of the spring abut pin 79 while the loop connecting the two coils extends over and about the second end of lever 80 to urge the same into clockwise rotation. The aforesaid second end of the lever is provided with axially spaced nose portions which, as door 18 moves past the position of Fig. 9, toward fully open position, engage the thickened part 73a of sear 73 and pivot it clockwise to cause pin 75 to ride up slot 72a and pivot escapement lever 71 to release the rocket held thereby, as previously described. As both doors are fully open at the time levers 71 release a rocket, the latter falls by gravity into the upwardly-facing semi-cylindrical portion 14. As the rocket drops into the launching tube, the nose portions move out of engagement with the sear and permit spring 76 to move lever 71 back to the position shown holding the next rocket ready for dropping into the launching tube. It will be understood that there are two of the mechanisms just described, one for each escapement lever, and that they operate simultaneously upon their respective levers.

*Safety features*

Mechanism is provided to prevent rotation of the launching tube from the position shown upon Fig. 8, that is, when doors 18 and 20 are open, unless and until a rocket is dropped therein by the preceding movement of door 18 to open position as just described. By such mechanism, the operator is informed that reloading is necessary and the useless movement of operating lever 24 and actuation of the firing mechanism is prevented. For this purpose, the rearward escapement actuating mechanism has associated therewith an abutment 82; Fig. 16, bolted to the inside wall of frame 1 in the transverse vertical plane through the escapement. A latch 81, Figs. 16 and 17, has a base 81a having spaced ears 81b and 81c with aligned holes by which the latch is pivoted upon a latch pin 83 fixed in a base 84. This base is secured over base 77a of the escapement bracket and has four screw holes which align with the corresponding holes in base 77a when the parts are properly assembled, whereby the same screws 85 are used to secure both parts to the pad 18c of door 18. The base 84 is notched as indicated at 86, Fig. 17, to straddle the ears of bracket 77, the ear 81b is formed as a stop member (see Fig. 16), which, when the latch is moved to the limiting position shown, by spring 87, engages beneath abutment 82 and releasably secures the launching tube against rotation. An arcuate projection 81d extends from the end of base 81a remote from pin 83 and passes through an aperture 86 in door 18. As will be clear from Fig. 16, the end of projection 81d is so located that, when in the full line position, it will be engaged by a rocket as the latter drops into the launching tube, and pivoted clockwise to move the stop member 81b out of engagement with abutment 82. As the member 81b is moved as aforesaid, the door 18 is released and is free to close counterclockwise about its hinge axis and when the member clears abutment 82.

When the launching chamber is closed, with a rocket therein, it is desirable as a matter of safety, that the chamber be maintained closed until the rocket is fired. The means now to be described, operates to effect this function. Referring to Figs. 13, 14 and 21, a lever 89 is pivoted by a pin 90 between lugs 91 integral with the forward central portion of semi-cylindrical part 14, at a location indicated by section line 13—13, Fig. 4. At one end the lever has an upstanding latch 89a fitting and extending upwardly through a hole in the bottom of the part while at its other end, a coil spring 92 acts to urge the latch into the position shown upon Fig. 21, where it projects a distance into the launching tube, to be engaged and forced downwardly by a rocket when one is positioned within the closed tube.

A pad 1f is formed on the lower portion of frame 1 (Fig. 14) and has a central opening over which is secured the base of a bracket 93 having spaced integral lugs 93a between which a stop element or latch 95 is pivoted by means of a pivot 94. This latch is of the general form shown upon Figs. 13, 14 and 15, and includes a finger 95a projecting through a slot 96 in the base of the bracket. A spring 97 has a coil about pivot pin 94 and ends which abut frame 1 and a projection on latch 95 to urge the latter clockwise as viewed at Fig. 14. Finger 95a abuts the frame to limit movement to the position shown. In this position latch 95 has a part which lies in the path of lever 89 when the latter is depressed by a rocket in the closed launching tube. When a rocket is dropped into the launching tube from the magazine, and the lever 89 is depressed thereby, the tube can be rotated to closed position because the projecting portion of safety lever 89 engages latch 95 and pivots the latter, against the tension of spring 97 until it clears the lever. When a rocket is within the firing chamber and the latter has been rotated to closed position, the latch 89a, being forced outwardly by the rocket to fully-extended position, normally prevents rotation of the chamber to open position by reason of engagement with latch 95. However, the parts are so related that, in an emergency, even with a rocket in the tube, the latter may be released for rotation to open position after pressing down upon its finger to rotate stop 95 out of the path of lever 89.

The stop lever bracket 93 has a pair of spaced parallel bores as indicated at 98, Fig. 15, in which the ends of a spring wire loop or detent 99 are anchored as by brazing. The detent is shaped as shown in Fig. 14 and is arranged to cooperate with a chamber stop or catch 100 secured to a pad 14a of firing chamber portion 14. As this portion rotates counterclockwise to the position shown in Fig. 13, the catch engages and flexes detent 99 and moves into a bowed portion thereof at the limiting open position, thus yieldingly holding the launching tube in open or loading position. This construction also serves as a positive stop limiting rotation of the tube assembly in the "tube open" direction, since the stop 100 cannot pass latch 95, as will be clear from Fig. 13.

The left hand door 18 of the launching tube is provided at its forward and rear portions with aligned spring cradles which are adapted to catch each rocket as it drops from the magazine, to cushion its fall and to releasably retain it in proper longitudinal position within the tube. The forward cradle 101, Figs. 8 and 16, is shown as a simple sheet of spring steel, rolled to a radius the same as that of door 18 and secured thereto along one longitudinal side edge, as by welding, adjacent hinge pin 19 as shown upon Fig. 16. The rearward cradle 103 is more complicated in construction because it incorporates means for yieldably engaging the rocket fins to locate and releasably retain the rocket in proper longitudinal position within the tube. Such a feature is desirable when the rocket is to be fired with the tube elevated above or below the horizontal.

Referring to Fig. 18, a sheet of spring steel 104 is of the same general dimension and form as sheet 101 and is secured to the door 18 at the rearward part thereof, in the same circumferential position. However, unlike cradle 101, sheet 104 has circumferentially-spaced projections or lugs in its forward edge, one of which is identified as 105. A detent member consists of a sheet 108 of spring steel of lesser thickness than sheet 104 having a generally flat central portion. The rear portion of this sheet is curved to fit the sheet 104 as shown upon Fig. 29 and is secured to the rear edge thereof as by rivets 106. A detent or indexing member 107 is secured to the forward upturned edge of sheet 108. The cradle sheets 104 and 106 are normally in line contact throughout their lengths, at which time detent 107 is positioned between lugs 105 with is arcuate edge above sheet 104 as shown upon Figs. 11 and 18. The launcher shown is for use with 3.5 inch rockets and detent 107 is so positioned that it has circumferentially-arranged notches in one or more of the vanes of the rocket, whereby the rocket is yieldingly held against longitudinal movement. Of course, when the rocket's propelling charge is initiated, the forward thrust causes detent 107 to be cammed downwardly to flex sheet 108 and release the rocket for flight. The construction described thus holds the rocket against axial creep, as might otherwise occur when the launcher is tilted, but instantly releases the rocket when fired. When doors 18 and 20 are in the closed position, with a rocket in the tube, cradles 101 and 103 are positioned within pockets such as 14b, Figs. 4, 11 and 18, which pocket is formed in section 14 to receive the major portion of cradle 103 when the latter is moved thereinto, upon closure of door 18, as indicated in dotted lines upon Fig. 18.

The firing circuit

Initiation of the propelling charge of a rocket within the launching tube is effected electrically by a trigger-operated generator in a circuit which includes the squib in the rocket and a normally open safety switch closed only by rotation of the launcher tube assembly to closed position. Hence the circuit is closed only when the tube is properly closed for firing.

The trigger-generator mechanism which per se forms no part of the invention, and which is therefore not shown in detail, is housed within a grip 109 secured to and projecting from the lower left forward portion of frame 1, Figs. 1, 2 and 3, and includes a finger guard 110 and a trigger portion 111 actuated when pressed to drive a miniature electric generator 112, Fig. 30. A lead 113 extends from the generator through an optionally-provided switch 126 to a binding post 114, Figures 11 and 30, attached to the inside surface of frame 1 and electrically connected with a spring clip 115. The binding post and clip are mounted upon an insulating base 116. The launching tube part 14 carries a housing generally identified at 117, Fig. 12, and comprising a casing 118 secured by screws 119 and 119' over an opening 120 in the wall of part 14. A resilient blade 121 is attached at one end between the casing and tube and has a pointed contact 122 secured to its other end and projecting through opening 120. A single contact blade 123 is fixed to housing 118 in position to engage between the leaves of clip 115 when the tube is rotated into its closed or firing position, as shown upon Fig. 30.

The contact 122 is so positioned axially of the tube 14 as to engage an insulated metallic band B secured to and extending about the vanes of the rocket when the latter is moved into contact with the launching tube as the latter is rotated to closed position. The aforesaid band upon the rocket is electrically connected with the firing squib of the rocket as indicated at C, Fig. 30, the circuit being completed from the squib by way of the rocket casing and launcher frame to the grounded lead 124 from generator 112. If desired, a manually operated switch 126 may be placed in lead 113. By this construction, operation of trigger portion 111 will be effective only if there is a rocket in the launcher tube and the latter has been rotated to closed or firing position.

Miscellaneous features

In order to afford a measure of support of the launcher tube intermediate its end bearings 6 and 10 and to provide some frictional restraint against rotation, there are provided upon the interior surface of frame 1, a pair of circumferentially-extending arcuate support members 127 and 128, provided with felt wipers and retainers 129 and 130. The arcuate wipers are held by their retainers in contact with circumferentially-extending arcuate tracks 131 and 132 formed integrally with firing chamber portion 14. These arcuate tracks and their mating supports provide support against the impact of the rocket mass when a rocket drops from the magazine into the firing chamber.

A sight 133, which may be a simple collimator with reticle, is mounted upon a pad 134, Figs. 1, 2 and 3, for pivotal movement about a vertical axis 135 whereby the sight may be folded compactly against the frame for protection when not in use. A cover 136 is pivoted to the sight casing and may be moved downwardly thereover to protect the otherwise exposed optical element, when folded. As the sight forms no part of the present invention, and may be replaced by other sights of known construction, it is deemed unnecessary to describe it in detail.

Operation

The operation of the improved launcher will be clear from the foregoing description and may be briefly resumed as follows. A magazine is first loaded with rockets either in position upon the launcher or detached therefrom, by removing cover 45 and dropping rockets in succession into the magazine. At this time a vertical guide strip 127, Fig. 22, positioned on the inner rear end of the magazine prevents the rockets from being loaded in the wrong direction since this strip will under such condition, engage the nose of a rocket and prevent it from dropping into the magazine. The guide strip is of further utility in that it must be straddled by the tail fins of the rocket and hence assists in making certain that each rocket is loaded with its fuse pin P, Fig. 22, in position to be clear of elements 61 and 62 as the rocket moves downwardly in the magazine. The first rocket loaded is caught and held by escapement levers 71 in the dotted line position of Figs. 6 and 9 and as each rocket, except the uppermost, moves into position, its pawl 63 snaps into position to prevent withdrawal and rebound. Fig. 6 shows in dotted lines the loaded positions for magazine holding four rockets.

If the magazine were detached when loaded, it is lifted by grips 52, lowered into opening 2, and secured merely by pushing down upon the grips as will be clear from Fig. 23.

Assuming the launcher tube to be empty and in closed position, the operator grasps lever 24 and raises it. Operation of the lever rotates the launching tube assembly through link 27, to first release clamp member 36 from hold-down rollers 40 and then, on continued rotation, to move the clamp out of holding relation with doors 18 and 20 and to pivot the doors to open position. As the parts move into the open or loading position of Fig. 8 (a) stop 100 snaps into the holding portion of detent 99, (b) latch part 81b snaps beneath abutment 82 and (c) levers 80 engage the respective sears 73 and move escapement levers 71 to release the lowermost rocket.

As the rocket drops into the open chamber, all others in the magazine move down one step. The released rocket first strikes extension 81d and pivots ear 81b to release the door hold-back catch, and then drops onto cradles 101 and 103, with detent 107 engaging in the preformed notch of at least one of the vanes of the rocket to locate and releasably hold the rocket against longitudinal movement. At this time, the rocket rests upon and is supported by the cradles, substantially out of contact with the launching tube proper.

Lever 24 is now forced downwardly resulting, in the manner previously described, in the clockwise rotation of the firing chamber assembly as a unit about axis 13. The first component of movement of the lever pivots door 18 to closed position following which the entire assembly rotates to close door 20, move clamp member 36 into position over the flanges of the doors, as in Fig. 6. As the assembly moves into final position, rollers 40 engage cam surfaces 42 to hold the clamp 36 in position against the high pressure within the launching tube engendered by launching of a rocket.

Movement of the doors 18 and 20 to closed position forces the rocket downwardly into seated or final position within the main launching-tube portion 14. This seating movement results in the counterclockwise pivotal movement of safety lever 89, as viewed in Fig. 21, so as to normally lock the launching tube in closed position until the rocket therein has been fired. In addition, the insulated metallic band B about the tail of the rocket makes electrical contact with element 122 to complete one portion of the firing circuit. Finally, with movement of the launching tube into firing position blade 123 moves between the leaves of clip 115 and, thus completes the firing circuit. The operator now aims by the use of sight 133 and, when ready, presses trigger 111 to energize the circuit and launch the rocket. As the rocket leaves the launching tube, lever 89 is moved by spring 92 back to the position of Fig. 21 so that latch 95 no longer prevents rotation of the tube in opening or loading movement, and the firing circuit is opened as the band B moves out of contact with element 122. The lever 24 may now be raised to open the launching tube doors and reload, as previously described. Firing may continue until all of the rockets have been launched. Under certain conditions of use rockets may be continuously loaded into the magazine by removing the top thereof and firing continued indefinitely. Several of the actions just described occur substantially simultaneously or in rapid succession.

In fact, rockets may be fed into the launcher and fired about as fast as lever 24 can be worked up and down.

While we have described the preferred embodiment of the invention as now known to us, numerous changes and substitutions of equivalents will occur to those skilled in the art after a study of the present disclosure and it is our desire and intention to reserve all such changes as fall within the scope of the subjoined claims.

Having now fully disclosed our invention, what we claim and desire to secure by Letters Patent is:

1. In a rocket launcher, a main body, a plurality of parts, each part being a portion of a cylinder, means hingedly connecting contiguous edges of said parts along all but the meeting edges of two successive parts, means rotatably mounting all said parts on said main body for rotation as a unit about an axis fixed relatively thereto, cam surfaces carried by said body, a cam rider fixed to each of said two successive parts, each rider slidably engaging a respective cam surface, whereby said two successive parts are pivoted between open and closed position by coaction between said cam surfaces and riders in response to rotation of said parts as a unit on said main body.

2. In a rocket launcher, a frame, a pair of open aligned bearings carried by said frame, a semi-cylindrical tube portion having sleeves at its ends journaled in said bearings, respectively, first and second quarter-cylindrical tube portions each having one edge hinged to a respective edge of said semi-cylindrical tube portions, the remaining edges of said quarter-cylindrical tube portions being pivotable from an open or loading position to a closed firing position with their remaining edges in contact to form with said semi-cylindrical tube portion a complete cylindrical tube, operating means carried by said frame and connected with said first quarter-cylindrical tube portion to rotate all said portions in said bearings, and means responsive to said rotation to pivot said quarter-cylindrical tube portions between said first and second positions.

3. A rocket launcher as recited in claim 2, said last-named means comprising a cam element secured to said frame and having cam surfaces, and a rider fixed to each quarter-cylindrical portion and engaging said surfaces to be pivoted thereby in response to rotation of all portions in said bearings.

4. A rocket launcher as recited in claim 2, said last-named means comprising first and second cam plates each fixedly carried by said frame at respective ends of said portions, there being cam grooves in said plates, and a pin carried by each quarter-cylindrical tube portion at each end thereof, each said pin riding in and being guided by a respective one of said cam grooves.

5. In a repeating rocket launcher, a body, a pair of open aligned bearings mounted in spaced relation in said body and defining a normally horizontal axis, a launching tube journaled in said bearings and having an opening in its side wall through which a rocket may be loaded into said tube, closure means comprising at least one door hinged to said tube and movable from an open position to a closed position closing said opening and forming with said tube a complete launching tube, a magazine removably mounted on said body in superposed relation therewith and adapted to contain a plurality of rockets movable in succession into said tube, means responsive to rotation of said tube to move said door between its open position when said opening is positioned to receive a rocket from said magazine and its closed position for firing a rocket from said tube, escapement means normally maintaining said rockets in said magazine, means operated by movement of said tube to door-opening position to actuate said escapement means to release a rocket in said magazine for movement into said tube, and means responsive to movement of said tube to door-closing position to lock said door and form a complete launching tube.

6. A rocket launcher comprising a main hollow body, a pair of open aligned bearings carried by said body at the respective ends thereof, a semi-cylindrical tube portion having coaxial sleeves at its ends each journaled in a respective bearing for rotation about the axis of said tube portion, a pair of quarter-cylindrical doors each hinged at one longitudinal edge to a respective corresponding edge of said tube portion, said doors being pivotable from a first open position wherein a rocket may be dropped into said tube portion, to a closed position wherein said tube portion and doors form a complete launching tube, means responsive to rotation of said tube portion to an upwardly-facing position to move said doors to open position, a magazine removably mounted in superposed position on said hollow body in communication therewith, said magazine being adapted to contain a plurality of rockets, escapement means operated by movement of one said door to open position to release the lowermost rocket in said magazine for movement by gravity into said tube portion, means for locking said doors in closed, tube-forming position, and means responsive to rotation of said tube portion out of upwardly-facing position to close said doors and operate said locking means.

7. In a repeater rocket launcher, a main body, forward and rear open aligned bearings carried by said body, a launching tube assembly including a semi-cylindrical tube portion having coaxial bearing sleeves at its ends, each sleeve being journaled in a respective one of said bearings, said assembly also including first and second quarter-cylindrical doors, each hinged along one edge to a respective edge of said tube portion, said doors being pivotable from a first closed position forming with said tube portion a complete launching tube, to a second open position in which a rocket may be loaded laterally into said tube portion, said doors having flanges along their free edges which meet when in first position, a clamp member hinged to said second door and pivotable from an open position free of said flanges to a clamping position holding said flanges in gas-tight relation, cam means carried by said main body, follower means carried by said doors and clamp member, all said follower means engaging said cam means and effective, in response to rotation of said launching tube assembly as a unit in said bearings, to move said doors and clamp member from open positions when said tube portion is in upwardly-facing position, to closed and clamping positions, respectively, when said assembly has been rotated through a predetermined angle, and means carried by said main body to rotate said assembly.

8. A repeater rocket launcher as in claim 7, and means carried by said main body and engaging said clamp member to hold the same in said clamping position in response to rotation of said launching tube assembly into closed position.

9. In a repeater rocket launcher, a main body having spaced aligned open-center bearings, a semi-cylindrical launching tube portion having end sleeves journaled in said bearings, respectively, for rotation about the axis of said portion, a magazine adapted to contain a plurality of rockets, means detachably securing said magazine in an opening in the top of said main body, a pair of quarter-cylinder doors each hinged along one side edge to a respective side edge of said tube portion, cam and follower means between said doors and main body and operable in response to rotation of said tube portion, to move said doors from an open position wherein a rocket can be dropped from said magazine into said tube portion, to a closed position wherein said tube portion and doors form a complete launching tube, escapement means responsive to movement of said doors to open position to release a rocket from said magazine for movement into said tube portion, latch means between one said door and said body to hold said tube portion and doors against rotation, and said latch means having a part operable to release the same, said part protruding into the path of a rocket dropping from said magazine for operation thereby, and manually operable means pivoted on said body and connected with said tube portion for rotating the same.

10. In a repeating rocket launcher, a main body, a launching tube assembly rotatably mounted in said main body, a magazine adapted to contain a plurality of rockets, releasable clamps detachably connecting said magazine to said body in superposed position over said assembly for removal and attachment at will, means responsive to rotation of said assembly to a first position to open the same to receive a rocket therein laterally from said magazine, means responsive to rotation of said assembly to a second position to close said assembly and form a complete launching tube, forwardly and rearwardly disposed spring-biased escapement levers carried by said magazine to positively and releasably retain said rockets in said magazine, and forwardly and rearwardly disposed spring-biased sears carried by said assembly and operating said escapement levers by and in response to rotation of said assembly to first position to thereby release a rocket in said magazine for movement into said assembly.

11. A repeating rocket launcher comprising a main body, a launching tube assembly journaled in said body for rotation about a normally horizontal axis coincident with the axis of said assembly, a magazine connected with said body in superposed position over said assembly, said assembly comprising a tube having hinged doors in the side wall thereof, means opening said doors in response to rotation of said assembly to a first position, to permit a rocket to be dropped thereinto from said magazine, means closing said doors in response to rotation of said assembly to a second position, to form a complete launching tube, escapement means responsive to movement of said assembly to first position to effect movement of a rocket from said magazine into said assembly, a firing circuit for firing a rocket in said assembly, said circuit including a first switch, and means closing said first switch only in response to rotation of said assembly to second position.

12. The rocket launcher recited in claim 11, said circuit also including a second switch in series with said first switch and comprising an insulated band on the rocket and a spring band on said assembly and engaged by said insulated band only when the rocket is in firing position in said launching tube assembly.

13. In a rocket-launching tube, a semi-cylindrical tube portion, first and second quarter-cylinder doors, each said door being hinged along one edge thereof to a respective longitudinal edge of said tube portion, said doors being pivotable from an open position wherein a rocket may be dropped into said tube portion, to a closed position forming, with said portion, a complete launching tube, spring cradle means secured to one said door to receive and cushion a rocket dropped into said portion, and detent means carried by said portion to contact and maintain a rocket in longitudinal position in said portion.

14. In a rocket-launcher tube, a semi-cylindrical tube portion, first and second doors adapted to collectively form a half-cylinder, means hingedly connecting each said door along a longitudinal edge thereof to a respective longitudinal edge of said tube portion, the free longitudinal edges of said doors having continuous flanges, said doors being pivotable from an open position wherein a rocket may be laterally loaded into said tube portion, to a closed position wherein said doors form, with said tube portion, a complete launching tube with said flanges in mating relation, and a continuous clamp member carried by one said door along and for pivotal movement on an axis parallel with a free edge thereof, said clamp member being generally U-shaped in cross section and pivotable to engage over said mating flanges and clamp said doors together in gas-tight relation, when closed.

15. In a repeating rocket launcher, a semi-cylindrical tube portion, first and second quarter-cylindrical doors, hinge means connecting each door along one longitudinal edge thereof to a respective longitudinal edge of said tube portion, a pair of spring cradles at respective ends of said tube portion, each said cradle being curved on a radius equal to that of said portion and secured to one of said doors along a linear element thereof to fit against the inner periphery of said portion when said one door is closed, and detent means carried by the rearward one of said cradles to engage a rocket resting on said cradles and maintain its longitudinal position with respect to said tube portion.

16. In a rocket launcher, a support, a launcher tube having an opening in the breech portion of its wall through which a rocket may be laterally loaded into said portion, a pair of doors hinged to said tube along respective side edges of said opening for pivotal movement relatively to said tube from a loading position wherein a rocket may be laterally loaded into said tube to a firing position wherein said doors conjointly close said opening, bearing means journaling said tube on said support for rotation about its longitudinal axis, and cam and cam rider means effective to actuate said doors between loading and firing positions in response to rotation of said tube.

17. A rocket launcher as recited in claim 16, magazine means adapted to be removably connected with said support to contain a plurality of rockets therein, and rocket indexing means carried by said magazine means and responsive to operation of one of said doors to loading position to release a rocket in said magazine means for movement into said tube.

18. In a repeating rocket launcher, a main body, a launching tube portion having a loading opening in its breech wall, means journaling said tube portion in said body for rotation about the longitudinal axis of said portion, a pair of doors hinged to said tube portion along respective side edges of said opening, means acting between said main body and doors and pivoting said doors, relatively to said tube portion in response to rotation of said tube portion and doors as a unit about said longitudinal axis, from an open loading position wherein said doors are open when said opening faces upwardly, to a firing position wherein said doors conjointly close said opening when the latter is rotated out of upwardly-facing position, a magazine for rockets mounted on said main body in superposed position over said opening, means operable to index rockets in succession through said opening into said tube portion, and means operated by pivotal movement of said doors to open position to actuate said index means to release a rocket for movement into said tube portion.

19. A rocket launcher as recited in claim 14, means journaling said tube portion and doors for rotation as a unit about the longitudinal axis of said tube portion, means automatically operating said doors between open and closed positions in response to rotation of said tube portion, a cam, and follower means connected with said clamp member and moving the same to clamping position by and in response to movement of said doors to closed position.

20. In an automatic rocket launcher a frame, axially spaced aligned bearings carried by said frame conjointly defining an axis of rotation fixed with said frame, a generally semi-cylindrical main barrel portion journaled in said bearings for rotation on said axis, first and second doors hinged along respective side edges of said main barrel portion for movement from a loading position wherein said doors are open, to a firing position wherein said doors are closed to conjointly form with said main barrel portion a closed tube, a cam plate fixed with said frame adjacent one said bearing and having first and second cam tracks therein, a cam rider fixed with each said door and extending into a respective cam track, said cam tracks being shaped to operate said riders and move said doors between loading and firing positions in response to rotation of said main barrel portion relatively to said frame.

21. An automatic rocket launcher as recited in claim 20, said doors having flanges along their free edges which mate when said doors are in firing position, a clamp member hinged to one said door and pivotable from a first position free of said flanges, to a second position embracing said flanges to hold the same in mating relation, and cam and rider means carried by said plate and clamp member, and operating to move said clamp member between first and second positions in response to rotation of said main barrel portion.

References Cited in the file of this patent
UNITED STATES PATENTS

| | | |
|---|---|---|
| 2,391,864 | Chandler | Jan. 1, 1946 |
| 2,440,634 | Henney | Apr. 27, 1948 |
| 2,451,522 | Uhl et al. | Oct. 19, 1948 |
| 2,504,160 | Skinner et al. | Apr. 18, 1950 |
| 2,546,823 | Holloway | Mar. 27, 1951 |